Nov. 24, 1942.   L. ZIMARIK   2,302,923
WATER LEVEL CONTROL FOR WASHING MACHINES AND THE LIKE
Filed March 19, 1940   4 Sheets-Sheet 1
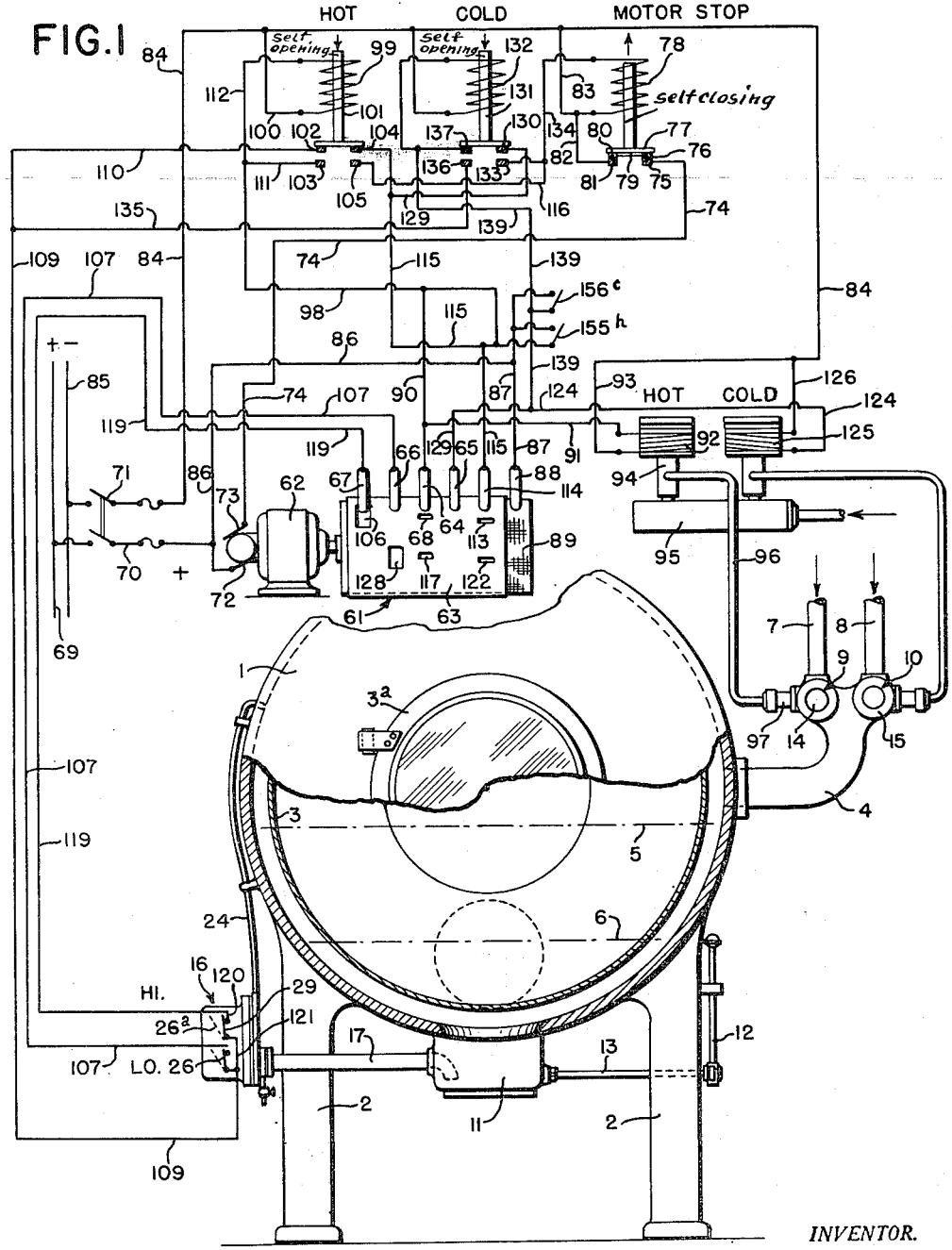
INVENTOR.
LOUIS ZIMARIK
BY Bodell and Thompson
ATTORNEYS.

Nov. 24, 1942.   L. ZIMARIK   2,302,923
WATER LEVEL CONTROL FOR WASHING MACHINES AND THE LIKE
Filed March 19, 1940   4 Sheets-Sheet 2
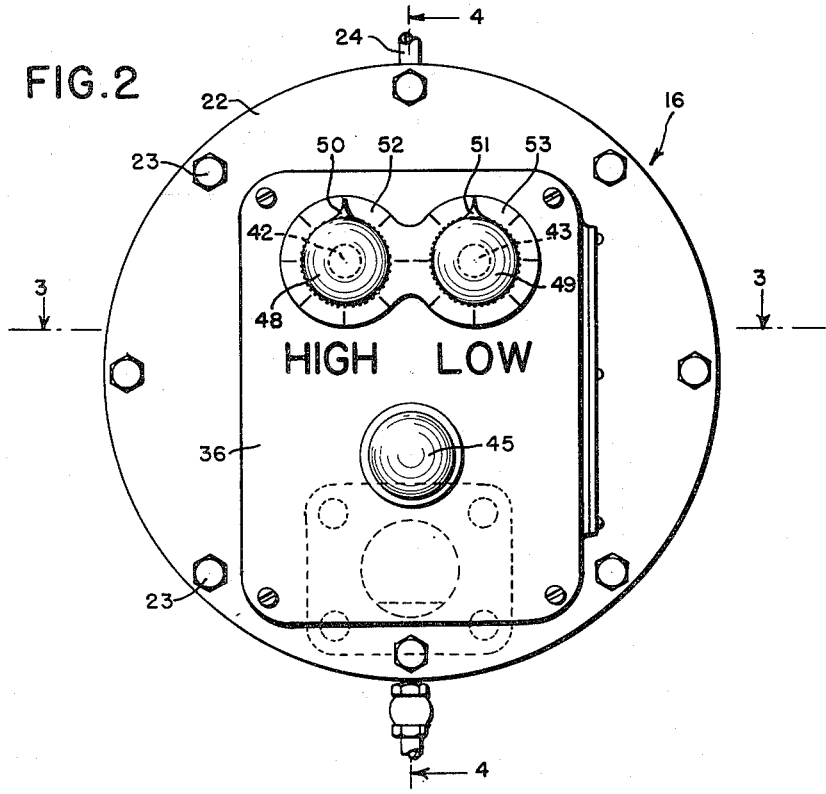
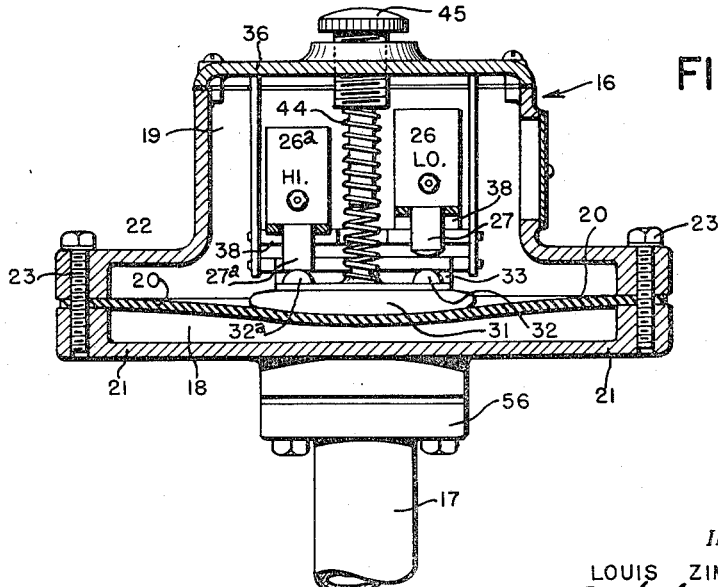
INVENTOR.
LOUIS ZIMARIK
BY Bodell and Thompson
ATTORNEYS.

Nov. 24, 1942.                L. ZIMARIK                2,302,923
         WATER LEVEL CONTROL FOR WASHING MACHINES AND THE LIKE
                  Filed March 19, 1940        4 Sheets-Sheet 3
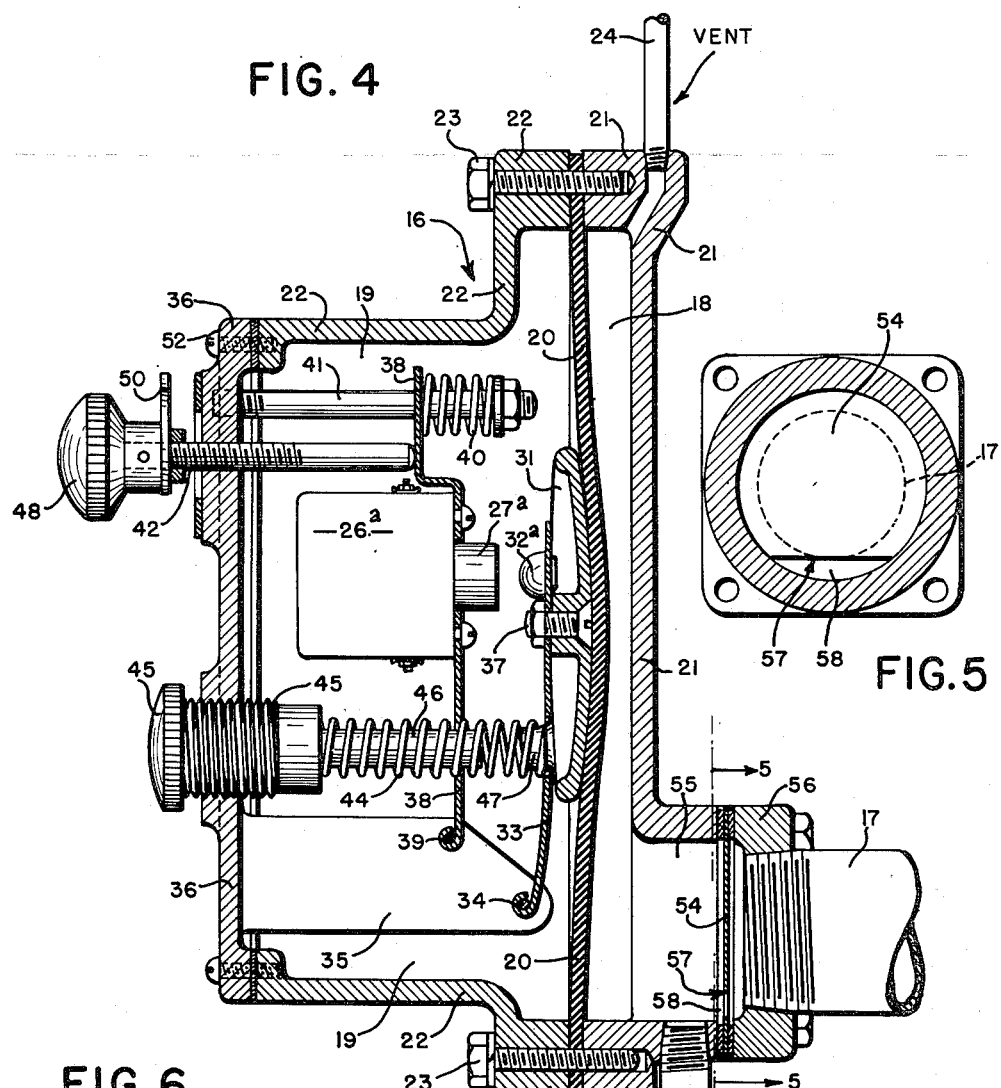
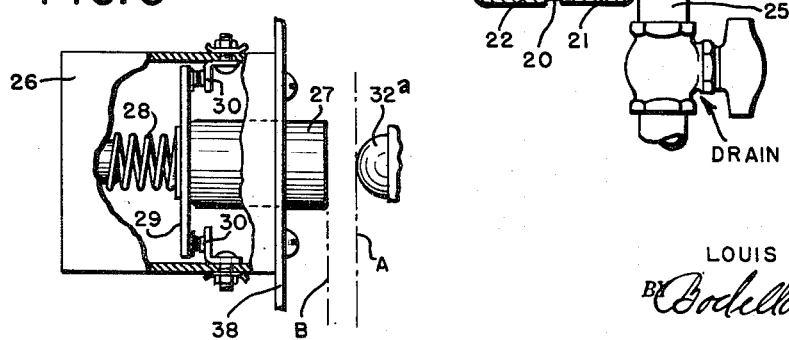
INVENTOR.
LOUIS ZIMARIK
BY Bodell and Thompson
ATTORNEYS.

Patented Nov. 24, 1942

2,302,923

UNITED STATES PATENT OFFICE 2,302,923

WATER LEVEL CONTROL FOR WASHING MACHINES AND THE LIKE

Louis Zimarik, Syracuse, N. Y., assignor to The Prosperity Company, Inc., Syracuse, N. Y., a corporation of New York Application March 19, 1940, Serial No. 324,815

4 Claims. (Cl. 137—68)

This invention relates to controls for the quantity of liquid feeding into a container, in order that a predetermined quantity will feed into the container, or the liquid fed therein until a predetermined level is reached, regardless of a time element, water pressure or rate of flow. It has for its object a control operable by the gravity weight, head or pressure of the liquid in the container, when a predetermined amount of liquid has been received by the container, or a predetermined level reached. As this control is shown herein as applied to a commercial laundry washing machine, the control will, for convenience, be called hereinafter, a water level control, although obviously it may control the level of any liquid in any container.

It further has for its object a water level control operable in connection with a work cycle timer, which controls the different operations of a machine, as a washing machine, which water level control also controls means which stops the timer and thus eliminates the time element until a predetermined quantity of water has been received in the container and effects the starting of the timer when the predetermined level is reached.

It further has for its object a water level control which is operated by the gravity weight or pressure of the liquid in the container, and also a level control so located relatively to a dump or drain valve of the container as to be emptied and cleaned when the drain valve is open.

It further has for its object a water level control operable by the gravity weight or pressure of the liquid in the container overcoming a counter force in the control, as that of a spring, to cut off the flow of water into the container, when the counter force is overcome by the pressure, head or weight of the water in the container.

It also has for its object a water level control consisting of a casing divided into two compartments by a diaphragm, one being a chamber communicating with the lower portion of the container, and the other a water and moisture proof switch compartment in which switch means are located for controlling electrically operated means for closing the valve in the feed pipe to the container, when a predetermined level of water or liquid in the container is reached.

It further has for its object such a water level control in which the diaphragm or movable member takes up a lost motion in the switch between open and closed position of the switch, as the pressure against the movable member or diaphragm increases, due to the amount of water in the container increasing, together with yielding means for varying the time element required to take up the lost motion, and thus adjust or vary the predetermined level desired in the container.

It further has for its object means for preventing the surging of the liquid in the container from being effective on the diaphragm or movable member of the water level control.

It also has for its object a water level control, which is particularly simple and economical in construction, and readily applied to the container or to the washing apparatus.

The invention consists in the novel features and in the combinations and constructions hereinafter set forth and claimed.

In describing this invention, reference is had to the accompanying drawings in which like characters designate corresponding parts in all the views.

Figure 1 is an end elevation, partly broken away, of a commercial laundry washing machine to which the water level control is applied, the cycle timer and the circuits controlled thereby and the circuits controlled by the water level control or the switch thereof for closing the valve or valves in the feed pipe of the container, being shown diagrammatically.

Figure 2 is an elevation of the water level control looking to the right in Figure 1.

Figure 3 is a sectional view on line 3—3, Figure 2.

Figure 4 is an enlarged sectional view on line 4—4, Figure 2.

Figure 5 is a sectional view on line 5—5, Figure 4.

Figure 6 is a detail view of the switch mechanism of the water level control.

Figure 7:
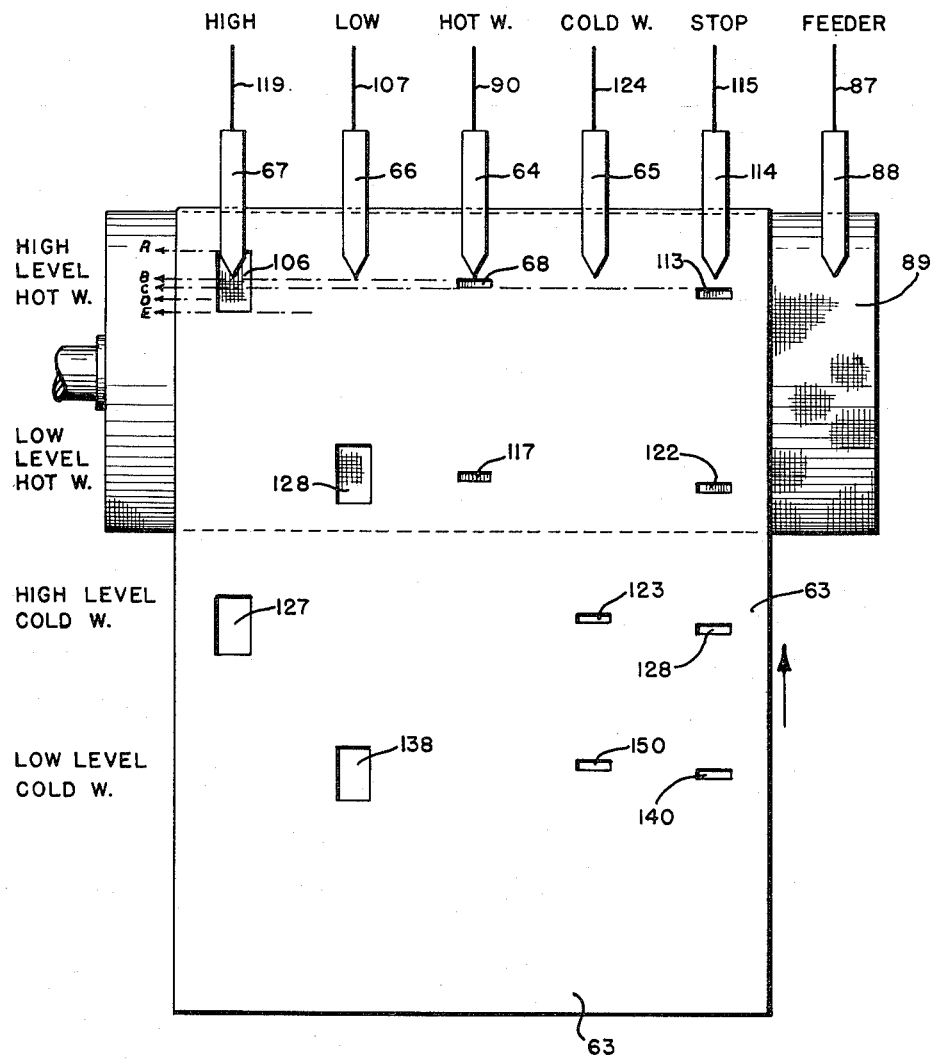
Figure 7 is a developed plan of the program sheet pertinent to the level control illustrating respectively, relative positions of perforations therein and contacts coacting therewith.

As before stated, the water level control is shown as applied to a commercial laundry washing machine, the operations of which are cycle timed.

1 designates the container or outer casing of one type of commercial washing machine, the casing being cylindrical and suitably supported in horizontal position, as by a frame 2. 3 is a drum rotatable on a horizontal axis within the container or casing 1. The washing machine is here shown as having an unloading and loading door 3ª at one end, which also opens and closes a door opening in the end of the drum 3. The drum 3 is actuated about its axis during the various washing operations, and as the washing operations in a commercial laundry washing machine are well understood, further description thereof is thought to be unnecessary.

4 designates the feed pipe for liquid or water communicating with the container or casing 1 above the highest level of liquid it is desired to maintain therein, this level being indicated by the line 5 (Figure 1). The lowest level is indicated by the line 6. The feed pipe 4 communicates with branch pipes 7 and 8 having control valves 9, 10 therein, the pipes 7, 8 communicating with supplies of hot and cold water respectively.

11 designates a drain or dump valve casing in the lowermost portion of the container 1, the valves 9, 10 and the drain valve 11 may be manually operated, although in the normal operation, they are timer operated.

12 designates a handle or operating member connected by a shaft 13 to the valve member of the drain valve 11 to open and close the drain valve. The valves 9 and 10 are also provided with suitable knobs or handles 14 and 15 for manual operation. The valves 9, 10 and 11 are self-closing, that is, they are closed automatically by any suitable means, when the force opening them is discontinued.

16 designates generally the water level control, this being located below the level of the lower portion of the container 1 and communicating with the container 1 through a conduit 17 opening into the lowermost portion of the container adjacent the dump valve, so that the gravity pressure, weight or head of the water in the container is transferred to the water level control to operate a pressure-operated member or diaphragm 20 therein, and also so that when the container is being drained, back suction through the conduit 17 is created to withdraw all the water and other matter from the water chamber of the water level control.

The water level control shown in Figure 4 comprises a casing divided into two compartments 18 and 19 by a flexible diaphragm or partition 20, the compartment 18 being a pressure or water chamber communicating through the pipe 17 with the container 1, and the chamber 19 being a switch chamber. The diaphragm 20 constitutes, in its broadest sense, a movable pressure-operated member. The diaphragm 20 is clamped at its margins between the sections 21, 22, as by screws 23. The diaphragm makes the switch compartment 19 water and moisture proof and being flexible, effects the operation of the switch or switches in the compartment 19. The chamber 18 is provided with a suitable vent or pressure-equalizing pipe 24, preferably communicating with the interior of the casing above the highest level of liquid therein, so that the only force effective on the diaphragm is the gravity pressure of the water in the container. The level control is also provided at its lower end with a suitable valve controlled drain pipe 25. The level control is suitably mounted or supported on the frame 2. It is here shown as supported by the conduit 17.

In the water level control here illustrated, two switches are employed, one to control the high, and the other, the low level, although one switch may be employed for both the high and low levels. Two switches, however, are employed to adjust the operation of one switch for high level and one for low level to avoid excessive and time-consuming adjustment of one switch from high to low level positions. The switches are alike in construction.

26, 26a designate the low and high level switch casings. The switches are alike in construction. Each switch, as shown in Figures 3 and 4, is of the push-button type, the operating element or push-button 27, 27a being movable against a returning spring 28 to carry the switch arm 29 operated thereby from closed position in engagement with the contacts 30 to open position. The motion of the diaphragm is transmitted to the element or push-button 27 or 27a through an intermediate member 31 engaging with the central portion of the diaphragm 20 and having heads or knobs 32, 32a arranged to thrust against the ends of the operating members or push-buttons 27, 27a. This intermediate member 31 is carried by a swinging arm or bracket 33 pivoted at 34 to an inwardly extending arm 35 carried by the removable cover 36 of the section 22 of the casing for the water level control 16. The intermediate member 31 is connected to the arm or bracket 33 in any suitable manner, as by screw bolts 37. The lost motion occurs when the diaphragm is moving from starting position toward and into engagement with the push-button against the opposing force of a spring. In Figure 6, the lost motion occurs between the lines A—B.

The switches 26, 26a are supported by similar arms 38 pivoted at 39 to the bracket 35, the arm 38 coacting at its end remote from the pivot 39 with a compression spring 40 on a stud 41 also carried by the cover 36. There are two of such arms 38, one for each switch 26, 26a, one switch controlling the low level, and the other switch, the high level, and these arms are held in adjusted position against the spring 40, by adjusting members or screws 42, 43, respectively, which are adjusted to shift the levers of the switches 26, 26a relative to each other. As seen in Figure 3, one adjusting screw may be used for both high and low levels, but in order to save time by avoiding excessive turning of a single screw, two screws are used, one for each switch 26, 26a. When the circuit of the switch 26a controlling the high level is closed by the timer, the switch 26 controlling the low level is idle or the circuit controlled thereby is dead or open, and hence, when the diaphragm 20 operates under the increasing pressure and takes up the lost motion between it and the push-button of the low level switch 26, it opens said switch 26, but as the switch 26 is in a dead or open circuit, closing of the low level switch 26 is merely an idle closing thereof. Continued movement of the diaphragm 20 under the increasing weight or pressure merely continues to depress the push-button 27a of the low level switch 26 against the spring 28 of the low level switch 26, while the lost motion between closed and open positions of the high level switch 26a is being taken up. The taking up of the lost motion in the switches is resisted by yielding means, as a spring 44, interposed between an adjustable hand screw 45 threading through the cover 36 and the intermediate member 31, the spring encircling suitable guide studs 46, 47 on the hand screw 45 and the intermediate member 31 respectively. This spring may be adjusted to the proper weight to offer sufficient counter force or to the pressure in the chamber 18, to take up the lost motion of either the high or low level switch. It also prevents fluctuation of the diaphragm 20 which would cause the switches to cut in and out. The adjusting screws 42, 43 are provided with suitable knobs or handles 48, 49 having pointers 50, 51 movable over dials 52, 53 which indicate various high levels and low levels at which the machine operates. The spring 44 constitutes adjustable means for applying a counter force to the gravity pressure of the water against the diaphragm less the maximum force required for a given water level.

Suitable baffle or choke means are provided for preventing surging of the liquid in the container 1 from being effective in the chamber 18 of the water level control 16. This means is here shown as a baffle 54 (Figures 4 and 5) arranged in the inlet 55 of the chamber 18 between the chamber and the coupling 56 by means of which the conduit 17 is coupled to the casing 21 of the water level control chamber 16. The baffle is discoidal with a cut-off at 57 along the chord of the arc thereof forming a restricted passage 58. This construction or baffle permits the use of a relatively large pipe 17 which is readily cleaned by the back suction action created when the drain valve in the washing machine 1 is open.

The various operations of the washing machine are cycle timed. For instance, the drum 2 is actuated or rocked back and forth about its axis for washing and rinsing operations by actuating mechanism, and these mechanisms controlled by the cycle timer. Also, the operations of the valves, as the drain valve, water valves, supply valves for agents, as bleach, solvent, blueing, sour, may be cycle timed. However, in so far as this invention is concerned, the cycle timing is pertinent only to the water level control.

61 (Figure 1) designates the cycle timer; 62 an electric motor for actuating it, the timer here shown being of the drum type with its peripheral surface an electric conductor, and the drum contacts provided by perforations in a program sheet wrapped around the drum.

Only that portion of the timer is shown which controls the opening and closing of the water valves and the high and low water levels. The operation or co-action of the timer and the level control switches will now be described.

In washing operations, there are hot water operations at different temperatures and cold water operations. The hot water enters the washing machine or container 1 through the pipe 4 from the hot water pipe 7 and the machine is equipped with a temperature control, and if the hot water is not up to the desired temperature, it is heated by the entrance of steam with the water. The cold water also enters the container 1 through the pipe 4 from the cold water pipe 8. The cold and hot water pipes 7 and 8 are controlled by the valves 9, 10. In so far as this invention is concerned, it is immaterial whether the water is hot or cold or mixed.

In the illustrated embodiment of my invention, the timer includes a hot water contact and high and low level contacts, a cold water contact which also operates in connection with high and low level contacts, and a contact which stops the timer while hot and cold water are being fed into the container 1, while the timer is stopped, until the desired high or low level is reached. The timer is stopped to eliminate the time element, because of varying water pressure and rate of flow.

64 designates the hot water contact; 65 the cold water contact; and 66, 67 the low and high level contacts respectively.

The circuit for the timer motor is from service wire 69 through wire 70, assuming the service switch 71 is closed, through brush 72 of the motor, out through brush 73, wire 74 to contact 75 which is normally engaged with contact 76 on the movable member or armature 77 of a self-closing electro-magnet or relay 78; thence through bridge 79 to another contact 80 of the armature to contact 81, thence through wires 82 and 83 to return wire 84 which is connected to the other service wire 85 through the service switch 71.

Assume that the container 1 has been emptied and the next operation is a high level hot water operation. The timer 61 during its rotation, brings perforation 68 in the program sheet 63 in position, so that contact 64 engages the periphery of the drum through the slot 68. The current then passes from the feed wire 69, closed service switch 70, through wire 86 to wire 87 to brush or contact 88 on the timer, which wipes on a conductor ring 89 on the timer; thence through the conducting cylinder of the timer to the contact 64, through wires 90, 91 to the windings of an electro-magnet or relay 92; thence through wire 93 to the return wire 84. The relay 92 opens the normally closed, self closing valve in a casing 94 which valve controls the flow of motive fluid, as compressed air, from a header 95 through a pipe 96 to a pressure-operated motor 97 associated with the hot water valve 9 which is also self-closing. The motor 97, when energized, opens the hot water valve 9 against the action of a returning spring, so that now the hot water is feeding from the pipe 7 through the open valve 9 and pipe 4 into the container 1. The current also passes from the timer drum through the hot water contact 64, wire 90, to wire 98 to the coils of a self-opening relay 99, and thence through wire 100 to return wire 84; thus energizing the relay 99 to cause its armature 101 to close the circuit between contacts 102 and 103 and between contacts 104 and 105. The engaging of contacts 102 and 103 closes a circuit through the high level switch 26ª of the level control 16, so that the current then flows from the feed wire 69 to the brush 88, conductor ring 89, conducting cylinder of the timer 61 to the high level contact 67 which has already established contact with the cylinder through a perforation 106 in the program sheet before the contact 67 has engaged the perforation 68, thence from contact 67 through wire 119 to one terminal of the high level switch 26ª through the arm 29 of said switch to wire 109, thence through wire 110, contacts 102, 103, wires 111 and 112, and the coils or relay 99, establishing a stick circuit for the relay 99. The timer, which has been working normally during this operation, brings a perforation or slot 113 in the program sheet into registration with a motor stop contact 114, after the contact 64 has passed out of the perforation 68 and while the contact 67, still establishes contact through perforation 106 and holds the stick relay closed, and hence maintains a closed circuit through the switch 16 and contacts 102 and 103. During this condition, hot water is flowing into the container 1. The current passes from the feed wire 69 through the brush 88, contact ring 89, conducting cylinder of the timer through the contact 114, wire 115 to the contact 104; thence through contact 105, because switch 99 is closed, wire 116 to the windings of the self-closing relay 78, back through the wire 83 to the return wire 84, thus energizing the movable member 77 of the relay to break the circuit normally established by the relay between the contacts 75 and 81 in the motor feed circuit, thus stopping the motor and the timer. When sufficient hot water feeds into the container 1, so that the gravity weight or pressure thereof actuates the high level switch 26ª to open it, the stick circuit for the relay 99 is broken by the opening of the level control switch 26ª, thus causing the movable member 101 of the self-opening relay 99 to separate the contacts 102, 103 and the contacts 104, 105, and break the circuit of the relay 78, permitting the relay 78 to again close the motor energizing circuit through the wire 74, so that the timer again starts on normal operation, opening the circuit through the relay or hot water controlled electro-magnet 92, which controls the flow of compressed air from the header 95 through the pipe 96 to the fluid operated means 97 for the valve 9. The timer then continues on its usual cycle, controlling various operations incidental to the washing and treating of the clothes in the drum 2.

Assuming that the operation calls for low level, hot water operation, a slot or perforation 117, similar to the slot or perforation 68, comes into register with the hot water contact 64 and at the same time, a similar slot 128, corresponding to the slot 106 comes into register with a low level contact 66 of the timer. The hot water valve relay 92 is energized, as before described in connection with the high, hot water level through the contact 64. Also, the circuit for the hot water level relay 99 is established, as before, through wires 90, 98, 112 and windings of the relay 99, wire 100 to the return wire 84, thus closing the contacts 102, 103, 104 and 105. The current also passes from the feed wire 69 through the feed contact finger 88, ring 89, conducting cylinder of the timer through the slot 128, contact 66, wire 107 to the low level switch 26, through the movable member 29 thereof, which is in closed position, through wire 121, wires 109, 110, closed contacts 102, 103, wires 111, 112, establishing the stick circuit for the relay 99. During this operation, the timer is being rotated, bringing the stop contact 114 of the timer into register with perforation 122 in the program sheet, corresponding to the perforation 113, so that the current passes, as before, through the contact 114, wire 115 through the closed contacts 104, 105, thence through wire 116, wire 134, energizing the self-closing relay 78, causing it to open the wire 74 of the motor circuit between contacts 81 and 75, so that the motor and the timer stops, it being understood that the contact 64 has passed out of registration with perforation 117 and that contact 66 is itself in register with perforation 128 holding relay 99 in closed position, the hot water valve relay 92 being energized through closed contacts 102 and 103. When the hot water feeds into the container 1 to a certain amount or to a certain low level, the movable member 29 of the low level control switch 26 will be opened, thus breaking the stick circuit to the self-opening relay 99 permitting the relay to separate contacts 102, 103, 104 and 105, thus breaking the circuit through the relay 78, so that it can return to its normal position, closing the circuit through the motor 62. Hence, the hot water stops flowing to the container 1 and the motor starts and the timer again proceeds in its normal operation.

The control for the high and low levels of cold water is through cold water contact 65, the high and low level contacts 67 and 66 in substantially the same manner as the high and low hot water levels are controlled through hot water contact 64 and the high and low level contacts 67 and 66, but through a self-opening relay 132 instead of relay 99. The relay 99 may be called the hot water level relay and 132 the cold water level relay. The circuit for the motor 62 through the closed electromagnetic switch 78 is the same as before described in connection with the hot water level control. When the slot or perforation 123 in the program sheet registers with the cold water contact 65, the current passes from the feed line 69 through wires 70, 86, wire 87, brush 88, ring 89, conductor part of the timer drum, contact 65, wire 124 to the windings of a magnet or relay 125 through wire 126 to the return wire 84. At the same time, a perforation or slot 127 (Figure 7) comes into register with the high level contact 67. The timer drum rotates until a slot 122 in the program sheet registers with the stop contact 114 so that the current passes from the timer drum through the contact 114, wire 115, wire 129, to contact 130 of the movable member 131 of the self-opening relay 132; thence through contact 133, and because the relay has been closed, to the high level timer contact 67; thence through wire 134 to the windings of the switch 78, energizing the same and breaking the motor circuit through the wire 74, thus stopping the motor.

The stick circuit for the relay 132 is established from the high level contact 67 to wire 119 through the movable member 29 of the high level switch 26ª; thence through wires 121, 109 and 135 to contact 136, contact 137 of movable member 131 of relay 132; thence through the windings of the relay 132, holding the relay 132 closed. When the high level is reached, the high level switch 26ª is opened, as before described, by the weight or pressure of the water in the container 1, thus breaking the stick circuit through the relay 132, stopping the flow of cold water to the machine 1, and hence breaking the circuit through the windings of the switch 78, permitting the movable member of the switch 78 to return to normal position, in which it closes the circuit through the motor, so that the motor starts and the timer proceeds in its operation.

For a low cold water level, the program sheet is provided with a perforation 138 which comes into registration with the low level contact 66, when the cold water contact 65 registers with a slot or perforation 150 in the program sheet. The current passes through the relay 125 which controls the cold water valve 10 in the same manner as before, and also passes from the low level contact 66 to wire 107 through the low level control switch 26, the movable member 29 of which is closed, and thence through wires 121, 109, 135, contacts 136 and 137 to establish the stick circuit for the relay 132, which has been previously closed through wire 124 leading from the cold water contacts 65, wire 124 to the circuit or windings of the relay 132. The closing of this relay 132 also brings the contacts 130 and 133 into engagement, so that when the stop contact 114 enters the stop slot or perforation 140 in the program sheet, the current passes from the stop contact 114 through wire 115, wire 129 to the engaged contacts 130, 133 through the windings of the switch 78, and thus opens the switch 75, 76 in the motor circuit, stopping the motor.

When the low level is reached, the movable member 29 of the low level switch 26 opens, thus breaking the stick circuit through the relay 132, stopping the flow of cold water to the machine 1, and hence breaking the circuit through the windings of the switch 78, causing the switch 78 to again close the motor circuit and the timer to proceed in its regular operation.

A brief résumé of the operation of the circuits (Figure 1) is as follows:

A. *Rinsing operation timer controlled*

Contact 67 registers with perforation 106. This completes circuit for holding the hot or cold water valves open after relay 99 has been actuated closing contacts 102, 103.

B. *Level control*

Contact 64 registers with perforations 68 actuating the solenoid 92 and water flows to container 1, also actuating relay 99 closing contacts 102 and 103 and 104 and 105, establishing a complete circuit through level control switch 16.

C. *Stopping of timer*

Contact 64 passes out of registry with cutout perforation 68 but relay 99 remains closed by closing of contacts 102 and 103. Upon the passing out of registry of contact 64 from perforation 68 contact 114 registers with perforation 113 stopping timer switch 62 through closed circuit established by the closed contacts 104 and 105.

D. *Water level switch opened and water valves closed*

When high water level is reached, circuit is broken holding relay 99 closed allowing contacts 102 and 103—104 and 105 to open cutting off current to water valve relay 92, stopping the flow of water to container 1 and cutting the current holding relay 78 open and allowing the timer switch to start moving contact 114 out of registry with perforation 113.

E. *Restarting timer motor*

Contact 67 moves out of registry with perforation 106; timer continues to rotate moving perforated sheet for further operations.

Thus, the level control switches close the stick circuits for hot and cold water relays, which close the circuit of windings of the cut-out switch 78 for the motor, when a slot in the program sheet of the timer registers with the stop contact 114 of the timer. When the high or low level, as the case may be, is reached, the switch in the water level control is opened by the weight of the water breaking the circuit through the stick circuit, and hence through the motor stop relay, so that the stop relay again closes the motor circuit. One of the relays, the stick circuits of which are controlled by the switch of the water level control, operates in connection with the cold water timer contact, and the other in connection with the hot water timer contact. Both high and low level timer contacts operate in connection with either the hot or cold water timer contact. Either of the relays, controlled by the water level control switches, controls the operation of the motor stop relay 78, when a slot in the program sheet registers with the stop contact 114. In any case, the level of water is accurately determined regardless of a time element, and of water pressure, and rate of flow.

The hot and cold water valves 8 and 9 may be controlled manually, independently of the timer, as by manually operable switches 155, 156 arranged to close the circuits through the electromagnets 92, 125 at any time.

What I claim is:

1. The combination with a container and a feed conduit for a liquid discharging into the container having a control valve therein; of a level control comprising a chamber having a movable pressure-operated member therein, a conduit connecting said chamber and the lower portion of the container, whereby the liquid in the container flows through the conduit into the chamber and actuates the member therein in accordance with the pressure or weight of the liquid in the container, and means operated by the movable member when actuated a predetermined amount for closing said valve, the container having a drain valve, the conduit being located in such position to the drain valve that back suction is created in the conduit, when the drain is opened, and the liquid in the chamber withdrawn from the same.

2. The combination with a container and a feed conduit for a liquid discharging into the container having a control valve therein; of a level control comprising a chamber having a movable pressure-operated member therein, a conduit connecting said chamber and the lower portion of the container, whereby the liquid in the container flows through the conduit into the chamber and actuates the member therein in accordance with the pressure or weight of the liquid in the container, and means operated by the movable member when actuated a predetermined amount for closing said valve, the container having a drain valve, the conduit being located in such position to the drain valve that back suction is created in the conduit, when the drain valve is opened, and the liquid in the chamber withdrawn from the same, and adjustable means for limiting the movement of said member to a predetermined amount.

3. The combination with a container and a feed conduit for a liquid discharging into the container having a control valve therein; of a level control comprising a chamber having a movable pressure-operated member therein, a conduit connecting said chamber and the lower portion of the container, whereby the liquid in the container flows through the conduit into the chamber and actuates the member therein in accordance with the pressure or weight of the liquid in the container, means operated by the movable member when actuated a predetermined distance for closing said valve, the container having a drain valve, the conduit being located in such position to the drain valve that back suction is created in the conduit, when the drain valve is open, and the water in the chamber withdrawn from the same, said chamber having a vent pipe connected to the upper portion of the container.

4. In a cycle timed washing apparatus including a container for a washing liquid, and a self-closing valve-controlled liquid inlet, the combination of a timer, an electric motor for actuating the timer, and a water level control including a normally-closed switch, the timer including a liquid control contact, a stop motor contact and a level control contact, the motor circuit including a normally-closed self-closing electro-magnetically operated switch, electrically operated means for opening the valve in the water feed inlet in circuit with the liquid control contact of the timer, a self-opening, normally-open relay switch in circuit with the liquid control contact, so that when the circuit is closed by the timer through the liquid control contact, the relay is energized into closed position, said electrically-operated normally-closed switch in the motor circuit being connected in the circuit with the stop motor contact by the relay when the relay is closed, so that when the circuit is closed by the timer through the motor stop contact, the motor circuit is opened and the motor and timer stopped, the level control switch being in circuit with the level control contact of the timer and with the relay to establish a stick circuit therefor and holding the relay closed until the circuit through the relay is opened by the level control switch, when the level control switch is opened, when the predetermined level is reached, and the motor and the timer again starts and breaks the circuit through the liquid control contact to effect the closing of the valve in the water feed circuit.

LOUIS ZIMARIK.